US010691601B2

(12) United States Patent
Li et al.

(10) Patent No.: US 10,691,601 B2

(45) Date of Patent: Jun. 23, 2020

(54) CACHE COHERENCE MANAGEMENT METHOD AND NODE CONTROLLER

(71) Applicant: Huawei Technologies Co., Ltd., Shenzhen (CN)

(72) Inventors: Tao Li, Hangzhou (CN); Yongbo Cheng, Chengdu (CN); Chenghong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/165,709

(22) Filed: Oct. 19, 2018

(65) Prior Publication Data

US 2019/0057032 A1 Feb. 21, 2019

Related U.S. Application Data

(63) Continuation of application No. PCT/CN2017/080311, filed on Apr. 12, 2017.

(30) Foreign Application Priority Data

Apr. 22, 2016 (CN) .......................... 2016 1 0256865

(51) Int. Cl.

*G06F 12/0817* (2016.01)
*G06F 12/1009* (2016.01)
*G06F 12/0813* (2016.01)

(52) U.S. Cl.

CPC ...... *G06F 12/0828* (2013.01); *G06F 12/0824* (2013.01); *G06F 12/1009* (2013.01); *G06F 2212/621* (2013.01)

(58) Field of Classification Search

None

See application file for complete search history.

(56) References Cited

U.S. PATENT DOCUMENTS 5,909,698 A * 6/1999 Arimilli .............. G06F 12/0808 711/145
6,654,858 B1 * 11/2003 Asher ................. G06F 12/0817 711/144

(Continued)

FOREIGN PATENT DOCUMENTS

CN 103020004 A 4/2013
CN 103294611 A 9/2013

OTHER PUBLICATIONS

Machine Translation and Abstract of Chinese Publication No. CN103020004, Apr. 3, 2013, 30 pages.

(Continued)

*Primary Examiner* — Michael Alsip

(74) *Attorney, Agent, or Firm* — Conley Rose, P.C.

(57) ABSTRACT

A cache coherence management method, a node controller, and a multiprocessor system that includes a first table, a second table, a node controller, and at least two nodes, where the node controller determines, in the first table according to address information of data, a first entry, where the first entry includes a first field and a second field. The first field records an occupation status of the data, the second field indicates a node that occupies the data exclusively when the first field includes an exclusive state, and the node controller determines a second entry in the second table according to the address information of the data and the second field when the first field includes a shared state, where the second entry includes a third field, and the third field indicates nodes that share the data.

20 Claims, 5 Drawing Sheets

(56) References Cited

U.S. PATENT DOCUMENTS

2011/0185128 A1* 7/2011 Ukai .................. G06F 12/0817
711/146
2014/0181412 A1 6/2014 Thottethodi et al.
2017/0132124 A1* 5/2017 Gschwind ............ G06F 8/4442

OTHER PUBLICATIONS

Machine Translation and Abstract of Chinese Publication No. CN103294611, Sep. 11, 2013, 26 pages.
Foreign Communication From a Counterpart Application, PCT Application No. PCT/CN2017/080311, English Translation of International Search Report dated Jul. 21, 2017, 2 pages.
Foreign Communication From a Counterpart Application, PCT Application No. PCT/CN2017/080311, English Translation of Written Opinion dated Jul. 21, 2017, 3 pages.

* cited by examiner

CACHE COHERENCE MANAGEMENT METHOD AND NODE CONTROLLER

CROSS-REFERENCE TO RELATED APPLICATIONS

This application is a continuation of International Patent Application No. PCT/CN2017/080311 filed on Apr. 12, 2017, which claims priority to Chinese Patent Application No. 201610256865.3 filed on Apr. 22, 2016. The disclosures of the aforementioned applications are hereby incorporated by reference in their entireties.

TECHNICAL FIELD

The present disclosure relates to the field of multiprocessor system technologies, and in particular, to a cache coherence management method and a node controller.

BACKGROUND

A multiprocessor system is a system that includes two or more processors that have similar functions. The processors can exchange data with each other, and all the processors share a memory, an input/output (I/O) device, a controller, and an external device. The entire hardware system is controlled by a unified operating system to implement concurrency of jobs, tasks, programs, and arrays and elements therein at all levels, between the processor and a program.

Most commercial cache coherent non-uniform memory access (CC-NUMA) multiprocessor systems use a directory-based cache coherence protocol, storages in the CC-NUMA multiprocessor system are physically distributed, and all local storages form shared global address space. A most obvious advantage of the CC-NUMA multiprocessor system is that a programmer does not need to explicitly allocate data to a node, and hardware and software in the system automatically allocate data to each node. During program running, cache coherence hardware automatically transfers data to where the data is required.

Referring to FIG. 1, FIG. 1 is a schematic architectural diagram of a CC-NUMA multiprocessor system. In the system, a plurality of nodes (for example, a Node 0, a Node 1, a Node 2, . . . , and a Node N) are interconnected using a network, each node includes a node controller (for example, an NC 0 in the Node 0 and an NC 2 in the Node 2) and at least one processor (for example, a central processing unit (CPU) 0, . . . , and a CPU n), and each processor includes a memory and a level 3 cache (L3).

In the CC-NUMA multiprocessor system, for all the nodes, a total L3 capacity is approximately hundreds of megabytes (MB), while a total memory capacity is usually approximately dozens of terabytes (TB). Generally, a majority of data cached by the processor is located in the memory, only a minority of data is located at L3, and even less data is cached at L3 of another node. To record data cached by another node, a directory (also referred to as DIR) is disposed on the node controller to store information about caching of data in a current node by a processor in the other node. For example, if data in the node 2 is cached by L3 of the CPU 0 in the node 0, a directory corresponding to the NC 2 records that the data is cached by the node 0, and records that a cache status of the data is shared or exclusive.

Referring to FIG. 2, FIG. 2 is a schematic structural diagram of a directory in a CC-NUMA multiprocessor system. The directory uses a cache structure, and the structure includes a tag array including tag entries of j groups (for example, $group_0$, $group_1$, $group_2$, $group_3$, . . . , $group_{j-2}$, and $group_{j-1}$) and m ways (for example, $way_0$, $way_1$, . . . $way_{m-2}$, and $way_{m-1}$) and a vector array including vector entries vector entries of j groups (for example, $group_0$, $group_1$, $group_2$, $group_3$, . . . , $group_{j-2}$, and $group_{j-1}$) and m ways (for example, $way_0$, $way_1$, . . . , $way_{m-2}$, and $way_{m-1}$). Both m and j are natural numbers, and the tag entries and the vector entries are in a one-to-one correspondence. Each tag entry includes a tag field and an occupation state field. The tag field is a most-significant-bit address of a memory address corresponding to data that the system is to access, and the state field includes an exclusive state and a shared state. Each vector entry includes a significant bit V field and a share vector field, and the share vector field is used to indicate a node that occupies the data exclusively or shares the data.

When the system accesses cross-node data, a node controller queries the directory according to a memory address corresponding to the data. If a node corresponding to the memory address is found, the data is extracted from the node. The memory address includes a tag field, an index field, and an offset field. Further, the node controller first determines a first group in a tag array according to the index field and determines a second group in a vector array according to the index field, and then sends tag fields corresponding to all tag entries in the first group to a comparator such that the comparator compares the tag fields with the tag field corresponding to the memory address. If a tag field in the tag fields matches the tag field corresponding to the memory address, a tag entry corresponding to the memory address is determined in the first group. Because the tag entries and the vector entries are in a one-to-one correspondence, a vector entry corresponding to the memory address may be determined in the second group according to the tag entry. Finally, the node controller extracts data corresponding to the memory address from a node that is indicated by the vector entry and that occupies the data exclusively or shares the data.

In the foregoing directory, the tag entries and the vector entries are in a one-to-one correspondence. The directory has highest precision in terms of data searching, but a directory capacity is also the largest. A larger directory capacity leads to a larger area, higher power consumption, a longer query time, and lower query efficiency.

SUMMARY

Embodiments of the present disclosure provide a cache coherence management method and a node controller. A directory capacity is reduced on the premise that directory query precision is not affected such that a query time is reduced, and query efficiency is improved.

A first aspect of the embodiments of the present disclosure provides a cache coherence management method, where the method is applied to a multiprocessor system, the multiprocessor system includes a first table, a second table, and at least two nodes, each node includes at least one processor, and the method includes determining, in the first table according to address information of data, a first entry corresponding to the address information, where the first entry includes a first field and a second field, the first field is used to record an occupation status of the data, and if the first field is an exclusive state, the second field is used to indicate a node that occupies the data exclusively, and determining a second entry in the second table according to the address information of the data and the second field if the first field is a shared state, where the second entry includes a third field, and the third field is used to indicate a node that shares the data.

A directory is queried separately from two paths using two query mechanisms for an exclusive state and a shared state to obtain a node that occupies the data exclusively or shares the data. In the embodiments of the present disclosure, a directory capacity is reduced on the premise that directory query precision is not affected such that a query time is reduced, and query efficiency is improved.

With reference to the first aspect of the embodiments of the present disclosure, in a first implementation of the first aspect of the embodiments of the present disclosure, the address information includes a tag field and an index field, determining, in the first table according to address information of data, a first entry corresponding to the address information includes determining, in the first table according to the index field, a first group corresponding to the address information, and determining, in the first group according to the tag field, the first entry corresponding to the address information, and determining a second entry in the second table according to the address information of the data and the second field includes determining a second group in the second table according to the index field, and determining the second entry in the second group according to the second field.

The index field is used to determine the first group in the first table and is used to determine the second group in the second table, and the tag field is used to determine the first entry in the first group. If the first field in the first entry is an exclusive state, the second field in the first entry is an owner field, and the owner field is used to indicate the node that occupies the data exclusively. If the first field is a shared state, the second field is a ptr pointer, the ptr pointer may be used to determine the second entry in the second group, and the third field in the second entry is used to indicate the node that shares the data.

With reference to the first implementation of the first aspect of the embodiments of the present disclosure, in a second implementation of the first aspect of the embodiments of the present disclosure, the index field includes M-bit information, and M is a positive integer greater than 1, and determining a second group in the second table according to the index field includes determining the second group in the second table according to N-bit information in the index field, where N is a positive integer greater than 0 but less than M.

To compress the second table vertically, a node controller determines the first group in the first table and determines the second group in the second table according to slightly different index fields. A quantity of binary address bits in an index field used when the node controller determines the second group in the second table is less than a quantity of binary address bits in an index field used when the node controller determines the first group in the first table. In this way, a quantity of rows in the second table can be greatly reduced.

With reference to any one of the first aspect of the embodiments of the present disclosure or the first to the second implementations of the first aspect of the embodiments of the present disclosure, in a third implementation of the first aspect of the embodiments of the present disclosure, before determining, in the first table according to address information of data, a first entry corresponding to the address information, the method further includes creating the first entry in the first table according to the data when a first node in the at least two nodes caches the data, setting the first field to an exclusive state, and setting the second field so that the second field indicates the first node.

The data in a current node is occupied exclusively by the first node when the data is cached by the first node in the at least two nodes for the first time. In this case, the node controller creates, in the first table of the directory, the first entry that records the data, sets the first field in the first entry to an exclusive state, and further sets the second field in the first entry to an owner pointer that indicates the first node. Because the data is occupied exclusively by the first node, the second entry does not need to be created in the second table of the directory.

With reference to the third implementation of the first aspect of the embodiments of the present disclosure, in a fourth implementation of the first aspect of the embodiments of the present disclosure, after creating the first entry in the first table according to the data, the method further includes determining the first entry in the first table according to the address information when a second node in the at least two nodes caches the data, and if the first field is an exclusive state, setting the first field to a shared state, determining the second group in the second table according to the address information, creating the second entry in the second group, setting indication information of the first node and the second node in the third field, and setting the second field according to location information of the second entry in the second table, or if the first field is a shared state, determining the second entry in the second table according to the address information and the second field, and adding indication information of the second node to the third field.

When the second node also caches the data after the data is occupied exclusively by the first node, the data is changed from an exclusive state to a shared state, and in this case, the node controller modifies the first entry corresponding to the data, for example, modifies the first field in the first entry to a shared state, and modifies the second field in the first entry to a ptr pointer. In addition, the node controller further creates the second entry in the second table according to the address information of the data, and sets the indication information of the first node and the second node in the third field in the second entry.

If the data occupied exclusively by the first node has been changed to a shared state before the second node caches the data, the node controller modifies the third field in the second entry corresponding to the data, that is, adds the indication information of the second node. Certainly, the node controller may not modify content of the second entry, but creates a fourth entry in the second table, and sets the indication information of the second node in a fourth field in the fourth entry. This is not limited herein.

With reference to the third implementation of the first aspect of the embodiments of the present disclosure, in a fifth implementation of the first aspect of the embodiments of the present disclosure, after creating the first entry in the first table according to the data, the method further includes determining the first entry in the first table according to the address information when a second node in the at least two nodes caches the data, and if the first field is an exclusive state, setting the first field to a shared state, determining the second group in the second table according to the address information, searching the second group for a third entry that includes indication information of the first node and the second node, determining the third entry as the second entry, and setting the second field according to location information of the second entry in the second table.

When the data occupied exclusively by the first node is shared by the second node, the second entry may not be created in the second table, but instead, it is learned, by means of searching according to the address information of the data, whether there is a third entry that is in the second table and that includes the indication information of the first node and the second node. If there is a third entry that includes the indication information of the first node and the second node, to avoid redundancy in the second table, the node controller may not create, in the second table, the second entry that is the same as the third entry, but uses the third entry as the second entry, and sets the second field in the first entry according to location information of the third entry in the second table. In this way, the second table can be compressed to some extent such that an overall directory capacity is reduced.

With reference to any one of the first aspect of the embodiments of the present disclosure or the first to the second implementations of the first aspect of the embodiments of the present disclosure, in a sixth implementation of the first aspect of the embodiments of the present disclosure, before determining, in the first table according to address information of data, a first entry corresponding to the address information, the method further includes creating the first entry in the first table according to the data when a first node in the at least two nodes caches the data, setting the first field to a shared state, determining the second group in the second table according to the address information, searching the second group for a third entry that includes indication information of the first node, determining the third entry as the second entry, and setting the second field according to location information of the second entry in the second table.

When the data is cached for the first time, the data may be cached in a shared state, and the node controller needs to create, in the first table, the first entry for the data. However, the node controller may not be in a hurry to create the second entry in the second table, but first learns, by means of searching, whether there is a third entry that is in the second table and that includes the indication information of the first node. If there is a third entry that includes the indication information of the first node, the third entry may be shared according to the foregoing method in order to avoid redundancy in the second table. Certainly, if a third entry that includes the indication information of the first node is not found in the second table, the second entry needs to be created in the second table.

With reference to any one of the first aspect of the embodiments of the present disclosure or the first to the second implementations of the first aspect of the embodiments of the present disclosure, in a seventh implementation of the first aspect of the embodiments of the present disclosure, before determining, in the first table, a first entry corresponding to the address information, the method further includes creating the first entry in the first table according to the data when a first node in the at least two nodes caches the data, setting the first field to a shared state, determining the second group in the second table according to the address information, creating the second entry in the second group, setting indication information of the first node in the third field, and setting the second field according to location information of the second entry in the second table.

The data in a current node may be shared by the first node when the data is cached by the first node in the at least two nodes for the first time. In this case, the node controller creates, in the first table of the directory, the first entry that records the data, sets the first field in the first entry to a shared state, further creates the second entry in the second table of the directory, sets the indication information of the first node in the third field in the second entry, and sets the second field in the first entry according to the location information of the second entry in the second table. The second field uses a ptr pointer.

With reference to the sixth implementation or the seventh implementation of the first aspect of the embodiments of the present disclosure, in an eighth implementation of the first aspect of the embodiments of the present disclosure, after creating the first entry in the first table according to the data, the method further includes determining the first entry in the first table according to the address information when a second node in the at least two nodes caches the data, determining the second entry in the second table according to the address information of the data and the second field, and adding indication information of the second node to the third field.

When the data shared by the first node is further shared by the second node, the node controller may modify the third field in the second entry corresponding to the data, that is, add the indication information of the second node. Certainly, the node controller may not modify content of the second entry, but creates a fourth entry in the second table, and sets the indication information of the second node in a fourth field in the fourth entry. This is not limited herein.

A second aspect of the embodiments of the present disclosure provides a node controller, applied to a multiprocessor system, where the multiprocessor system includes a first table, a second table, and at least two nodes, each node includes at least one processor, and the node controller includes a first determining module configured to determine, in the first table according to address information of data, a first entry corresponding to the address information, where the first entry includes a first field and a second field, the first field is used to record an occupation status of the data, and when the first field is an exclusive state, the second field is used to indicate a node that occupies the data exclusively, and a second determining module configured to determine a second entry in the second table according to the address information of the data and the second field when the first field is a shared state, where the second entry includes a third field, and the third field is used to indicate a node that shares the data.

With reference to the second aspect of the embodiments of the present disclosure, in a first implementation of the second aspect of the embodiments of the present disclosure, the address information includes a tag field and an index field, that a first determining module is configured to determine, in the first table according to address information of data, a first entry corresponding to the address information includes the first determining module is configured to determine, in the first table according to the index field, a first group corresponding to the address information, and determine, in the first group according to the tag field, the first entry corresponding to the address information, and that a second determining module is configured to determine a second entry in the second table according to the address information of the data and the second field when the first field is a shared state includes the second determining module is configured to determine a second group in the second table according to the index field, and determine the second entry in the second group according to the second field.

With reference to the first implementation of the second aspect of the embodiments of the present disclosure, in a second implementation of the second aspect of the embodiments of the present disclosure, the index field includes M-bit information, and M is a positive integer greater than 1, and that the second determining module is configured to determine a second group in the second table according to the index field, and determine the second entry in the second group according to the second field includes the second determining module is configured to determine the second group in the second table according to N-bit information in the index field, where N is a positive integer greater than 0 but less than M.

With reference to any one of the second aspect of the embodiments of the present disclosure or the first to the second implementations of the second aspect of the embodiments of the present disclosure, in a third implementation of the second aspect of the embodiments of the present disclosure, the node controller further includes a creation module and a setting module, and before the first determining module determines, in the first table according to the address information of the data, the first entry corresponding to the address information, the creation module is configured to create the first entry in the first table according to the data when a first node in the at least two nodes caches the data, and the setting module is configured to set the first field to an exclusive state, and set the second field so that the second field indicates the first node.

With reference to the third implementation of the second aspect of the embodiments of the present disclosure, in a fourth implementation of the second aspect of the embodiments of the present disclosure, after the creation module creates the first entry in the first table according to the data, the first determining module is further configured to determine the first entry in the first table according to the address information when a second node in the at least two nodes caches the data, if the first field is an exclusive state, the setting module is further configured to set the first field to a shared state, the second determining module is further configured to determine the second group in the second table according to the address information, the creation module is further configured to create the second entry in the second group, and the setting module is further configured to set indication information of the first node and the second node in the third field, and set the second field according to location information of the second entry in the second table, or if the first field is a shared state, the second determining module is further configured to determine the second entry in the second table according to the address information and the second field, and the setting module is further configured to add indication information of the second node to the third field.

With reference to the third implementation of the second aspect of the embodiments of the present disclosure, in a fifth implementation of the second aspect of the embodiments of the present disclosure, the node controller further includes a search module, after the creation module creates the first entry in the first table according to the data, the first determining module is further configured to determine the first entry in the first table according to the address information when a second node in the at least two nodes caches the data, and if the first field is an exclusive state, the setting module is further configured to set the first field to a shared state, the second determining module is further configured to determine the second group in the second table according to the address information, the search module is configured to search the second group for a third entry that includes indication information of the first node and the second node, the second determining module is further configured to determine the third entry as the second entry, and the setting module is further configured to set the second field according to location information of the second entry in the second table.

With reference to any one of the second aspect of the embodiments of the present disclosure or the first to the second implementations of the second aspect of the embodiments of the present disclosure, in a sixth implementation of the second aspect of the embodiments of the present disclosure, the node controller further includes a creation module, a setting module, and a search module, and before the first determining module determines, in the first table according to the address information of the data, the first entry corresponding to the address information, the creation module is configured to create the first entry in the first table according to the data when a first node in the at least two nodes caches the data, the setting module is configured to set the first field to a shared state, the second determining module is further configured to determine the second group in the second table according to the address information, the search module is configured to search the second group for a third entry that includes indication information of the first node, the second determining module is further configured to determine the third entry as the second entry, and the setting module is further configured to set the second field according to location information of the second entry in the second table.

With reference to any one of the second aspect of the embodiments of the present disclosure or the first to the second implementations of the second aspect of the embodiments of the present disclosure, in a seventh implementation of the second aspect of the embodiments of the present disclosure, the node controller further includes a creation module and a setting module, and before the first determining module determines, in the first table according to the address information of the data, the first entry corresponding to the address information, the creation module is configured to create the first entry in the first table according to the data when a first node in the at least two nodes caches the data, the setting module is configured to set the first field to a shared state, the second determining module is further configured to determine the second group in the second table according to the address information, the creation module is further configured to create the second entry in the second group, and the setting module is further configured to set indication information of the first node in the third field, and set the second field according to location information of the second entry in the second table.

With reference to the sixth implementation or the seventh implementation of the second aspect of the embodiments of the present disclosure, in an eighth implementation of the second aspect of the embodiments of the present disclosure, after the creation module creates the first entry in the first table according to the data, the first determining module is further configured to determine the first entry in the first table according to the address information when a second node in the at least two nodes caches the data, the second determining module is further configured to determine the second entry in the second table according to the address information of the data and the second field, and the setting module is further configured to add indication information of the second node to the third field.

A third aspect of the embodiments of the present disclosure provides a node controller, including a processor, a storage, and a bus, where the storage is configured to store an execution instruction, the processor and the storage are connected using the bus, and when the storage runs, the processor executes the execution instruction stored in the storage such that the node controller executes the method according to any one of the first aspect or the first to the eighth implementations of the first aspect of the embodiments of the present disclosure.

In the technical solutions provided in the embodiments of the present disclosure, the directory is queried separately from two paths using two mechanisms for an exclusive state and a shared state to learn of the node that occupies the data exclusively or shares the data. Therefore, compared with the other approaches, in the embodiments of the present disclosure, a directory capacity is reduced on the premise that directory query precision is not affected such that a query time is reduced, and query efficiency is improved.

DESCRIPTION OF EMBODIMENTS

The following clearly describes the technical solutions in some of the embodiments of the present disclosure with reference to the accompanying drawings in some of the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first," "second," "third," "fourth," and so on (if existent) are intended to distinguish between similar objects but do not necessarily indicate a specific sequence. It should be understood that data termed in such a way is interchangeable in proper circumstances so that the embodiments described herein can be implemented in other sequences than the order illustrated or described herein. Moreover, the terms "include," "contain" and any other variants mean to cover the non-exclusive inclusion, for example, a process, method, system, product, or device that includes a list of steps or units is not necessarily limited to those steps or units expressly listed, but may include other units not expressly listed or inherent to such a process, method, product, or device.

In a multiprocessor system, during design of a directory disposed on a node controller, a capacity and precision selection problem exists. When a directory capacity is large, precision is high, but an area is large and power consumption is high, when a directory capacity is small, precision is low or a directory overflow problem is relatively serious. Due to the directory overflow problem, remote data becomes invalid, and system performance is greatly affected.

It is found by analyzing directory data that, although the entire multiprocessor system can share data, in a short period of time, a large proportion, approximately 90%, of data is in an exclusive state, that is, only one node caches the data. In addition, due to program access locality, an application program always consecutively accesses a small segment of addresses, that is, the small segment of consecutive addresses probably have a same directory, that is, are cached by a same node.

It may be learned from the foregoing analysis that there is a redundant directory entry and a waste of directory entry space. Therefore, in the embodiments of the present disclosure, on the premise that directory query precision is not affected, the directory is optimized in two aspects. First, the directory is queried separately from two paths using two query mechanisms for an exclusive state and a shared state such that a directory space waste is avoided. Second, one directory entry may be shared such that redundant directory entries are reduced.

Figure 1:
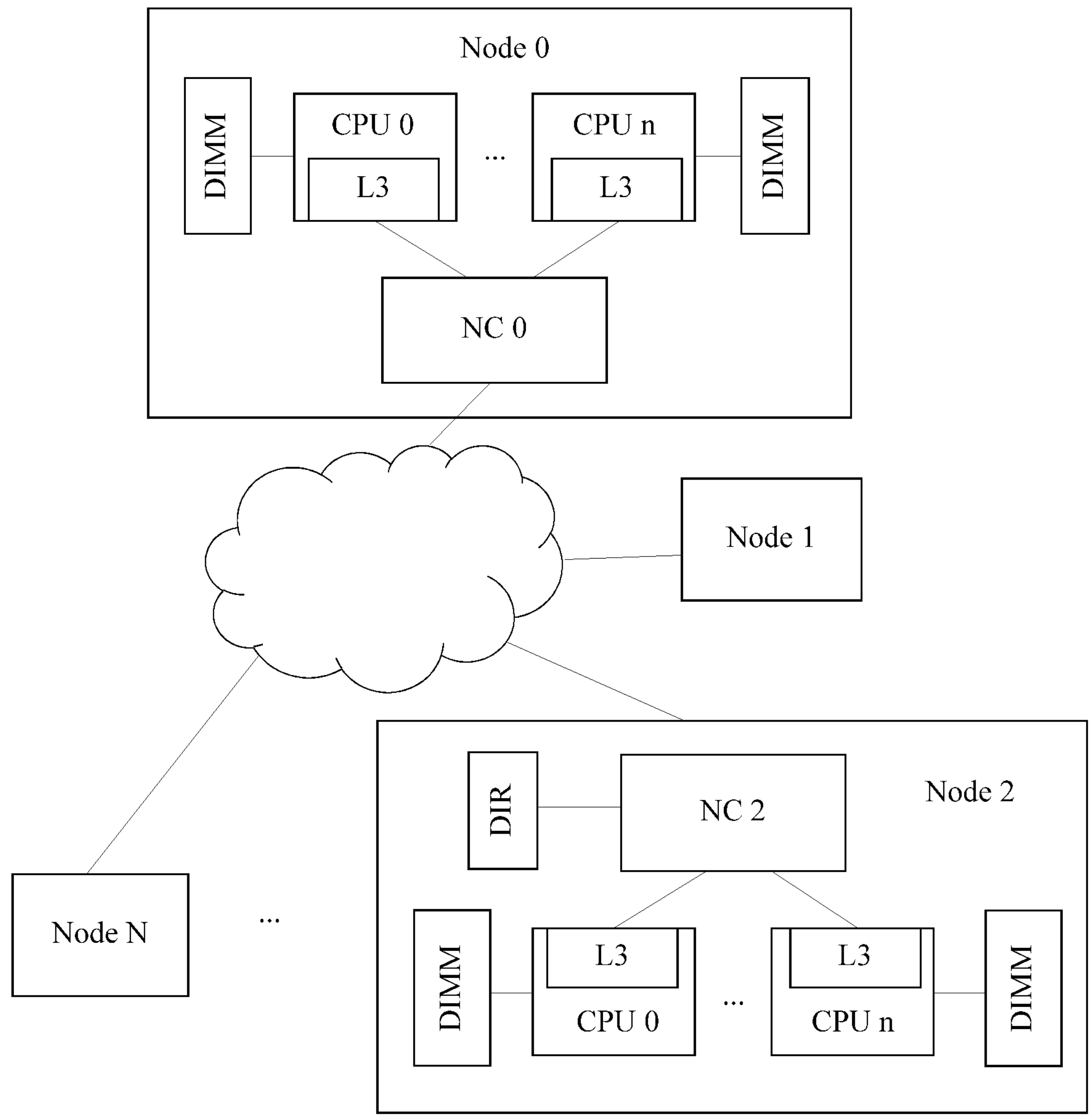
FIG. 1 is a schematic architectural diagram of a CC-NUMA multiprocessor system.
Figure 2:
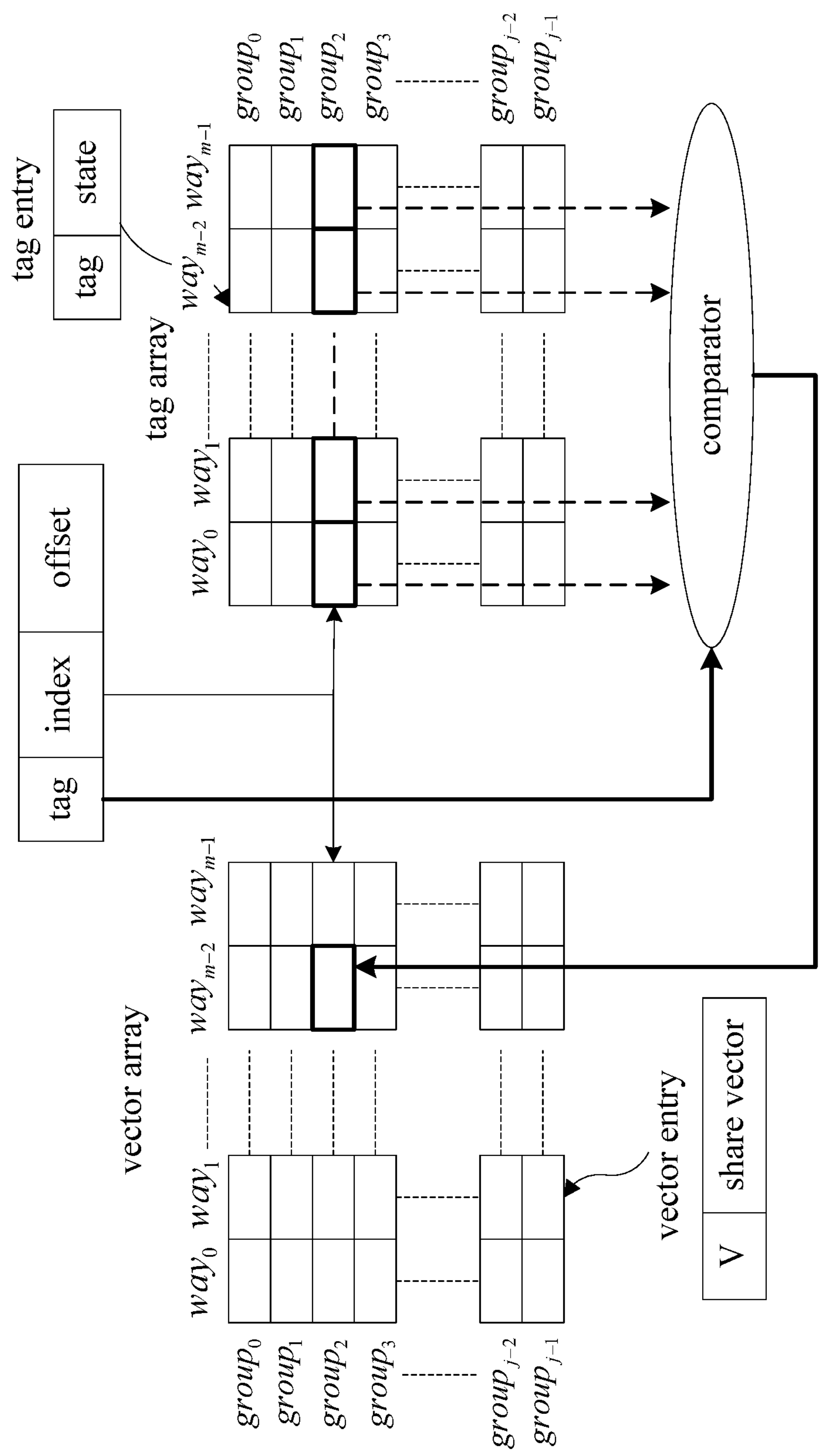
FIG. 2 is a schematic structural diagram of a directory in a CC-NUMA multiprocessor system.
Figure 3:
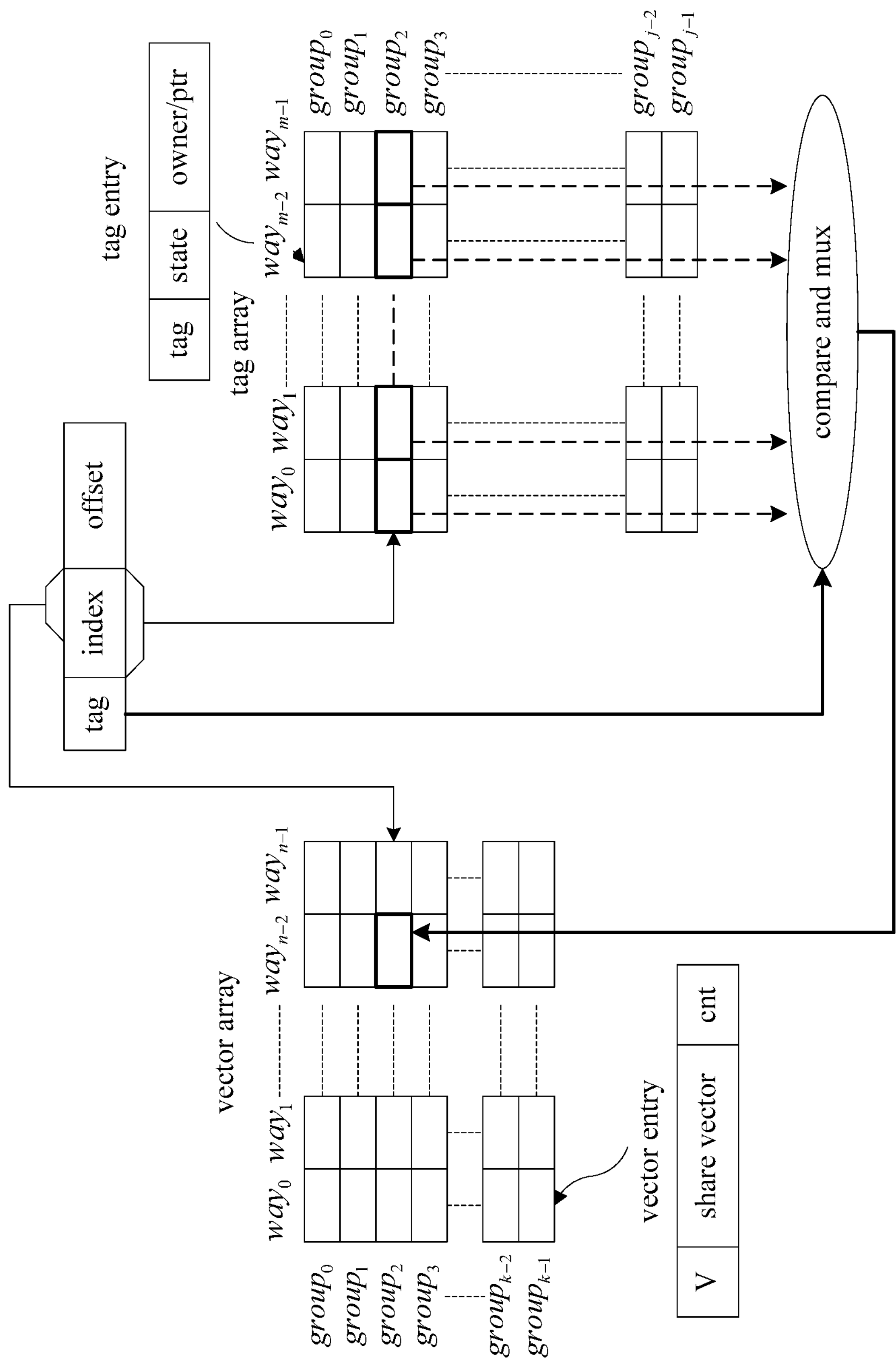
FIG. 3 is a schematic structural diagram of an improved directory in a CC-NUMA multiprocessor system according to an embodiment of the present disclosure.

Referring to FIG. 3, FIG. 3 is a schematic structural diagram of an improved directory in a CC-NUMA multiprocessor system according to an embodiment of the present disclosure. The directory still uses a cache structure. Different from an existing directory, in this embodiment of the present disclosure, the directory is separately queried for data in an exclusive state and data in a shared state using two different paths such that a capacity of a vector array in the directory is reduced to a great extent, and an overall directory capacity is reduced.

The directory includes a tag array and a vector array. The tag array includes tag entries of j groups (for example, $group_0$, $group_1$, $group_2$, $group_3$, . . . , $group_{j-2}$, and $group_{j-1}$) and m ways (for example, $way_0$, $way_1$, . . . , $way_{m-2}$, and $way_{m-1}$), and the vector array includes vector entries of k groups (for example, $group_0$, $group_1$, $group_2$, $group_3$, . . . , $group_{k-2}$, and $group_{k-1}$) and n ways (for example, $way_0$, $way_1$, . . . , $way_{n-2}$, and $way_{n-1}$), where j is greater than k, and m is greater than n.

It may be learned from the foregoing content that the vector array is compressed both horizontally and vertically, that is, a quantity of ways of the vector array is reduced, and a quantity of groups of the vector array is also reduced. Certainly, in this embodiment of the present disclosure, the vector array may be compressed only horizontally or only vertically. This is not limited herein.

Furthermore, each tag entry includes a tag field, a state field, and a pointer (owner/ptr) field. Each vector entry includes a V field, a share vector field, and a count (cnt) field.

According to different cache statuses of data, pointer fields used in tag entries are also different. For example, for data in an exclusive state, an owner pointer is used for the pointer field in the tag entry for indication, and the owner pointer may be used to indicate a node that occupies the data exclusively. For data in a shared state, a ptr pointer is used for the pointer field in the tag entry for indication, the ptr pointer and an index field in a memory address may be used together to determine a vector entry in the vector array, and a share vector field in the vector entry may be used to indicate a node that shares the data.

Optionally, the cnt field may be further added to the vector entry to count up how many tag entries correspond to the vector entry. For example, when one tag entry corresponding to the vector entry is newly added, a value of cnt in the vector entry is increased by 1, when a tag entry corresponding to the vector entry overflows or is removed or replaced, a value of cnt in the vector entry is reduced by 1, when the value of cnt in the vector entry is reduced to 0, it indicates that no tag entry corresponds to the vector entry, and data corresponding to the vector entry may be changed from a shared state to an exclusive state, and in this case, the share vector field in the vector entry is not required to indicate the node that shares the data, and the vector entry can be deleted.

A multiprocessor system with a 40-bit system address and 16 nodes is used as an example to compare a capacity of an existing directory in a multiprocessor system and a capacity of an improved directory in the multiprocessor system in this embodiment of the present disclosure. A 16-way set associative cache design is used for the directory in the multiprocessor system. Details are described as follows.

The capacity of the existing directory is calculated as follows.

It is assumed that an index field is 10 bits, a tag field is 30 bits, a state field is 2 bits, and a share vector field is 16 bits.

A capacity of a tag array is $(30+2)\times16\times2^{10}=512$ kilobits (kbits), where each tag entry is (30+2)=32 bits, and there are in total 16 ways and $2^{10}$ groups (that is, the 10-bit index field corresponds to $2^{10}$ groups).

A capacity of a vector array is $16\times16\times2^{10}=256$ kbits.

The capacity of the directory in this embodiment of the present disclosure is calculated as follows.

It is assumed that an index field is 10 bits, a tag field is 30 bits, a state field is 2 bits, a pointer (owner/ptr) field is 4 bits, a share vector field is 16 bits, and a cnt field is 3 bits.

A capacity of a tag array is $(30+2+4)\times16\times2^{10}=576$ kbits.

(1) If a depth of a vector array is reduced to ¼, the depth is $2^8$, and a capacity of the vector array is $(16+3)\times16\times2^8=76$ kbits.

The directory is compressed to (576+76)/(512+256)=84.9%.

(2) If a depth of a vector array is reduced to ⅛, the depth is $2^7$, and a capacity of the vector array is $(16+3)\times16\times2^7=38$ kbits.

The directory is compressed to (576+38)/(512+256)=80%.

It may be learned from the foregoing comparison that in this embodiment of the present disclosure, the capacity of the vector array is reduced to a great extent such that an overall directory capacity is reduced. In addition, a set of new query rules is used for the compressed directory such that query precision of the improved directory is not affected. In addition, two query mechanisms for an exclusive state and a shared state are used such that a directory query time is reduced, and query efficiency is improved.

The structure of the improved directory in the CC-NUMA multiprocessor system in the embodiments of the present disclosure is described above, and a cache coherence management method in the embodiments of the present disclosure is described below.

Figure 4:
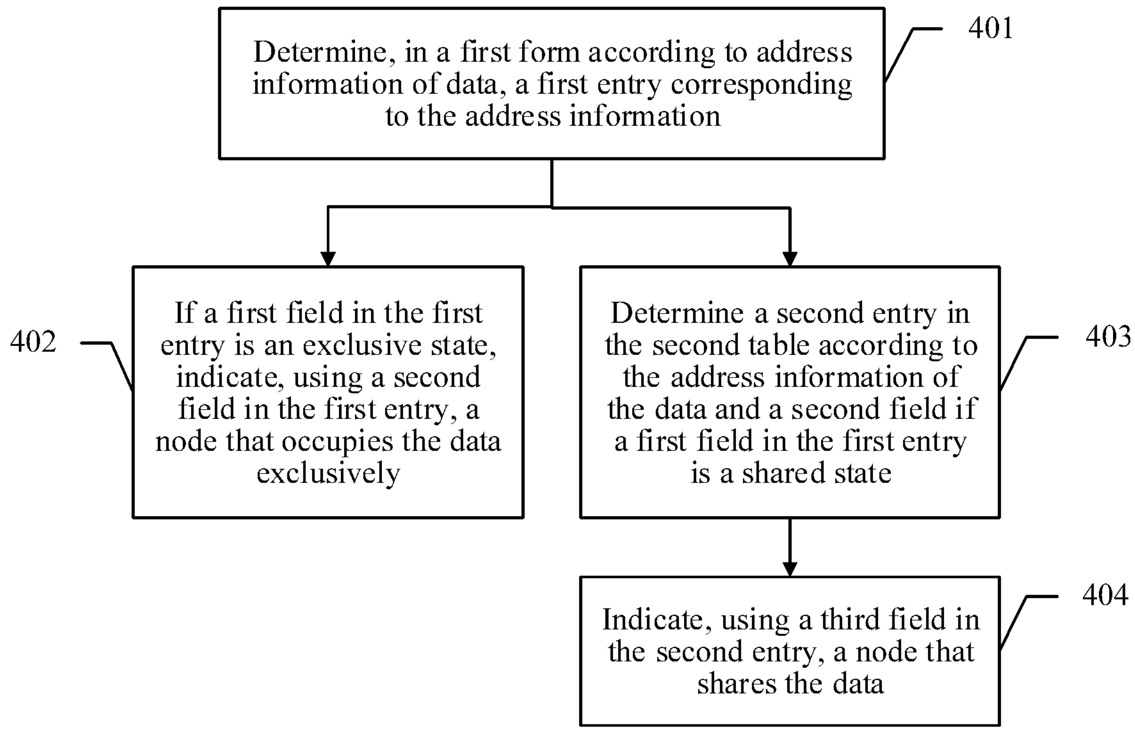
FIG. 4 is a flowchart of steps of an embodiment of a cache coherence management method according to the embodiments of the present disclosure.

Referring to FIG. 4, FIG. 4 is a flowchart of steps of an embodiment of a cache coherence management method according to the embodiments of the present disclosure. The method is applied to a multiprocessor system, the multiprocessor system includes a first table (that is, the foregoing tag array), a second table (that is, the foregoing vector array), and at least two nodes, and each node includes at least one processor. The method includes the following steps.

Step 401. Determine, in the first table according to address information of data, a first entry corresponding to the address information.

When accessing cross-node data, the system sends address information, such as a memory address, corresponding to the data to a node controller, and the address information includes a tag field, an index field, and an offset field. After receiving the address information, the node controller queries, according to the address information, a directory disposed on the node controller to learn of a node that occupies the data exclusively or shares the data.

Further, the node controller first determines, in the first table according to the index field, a first group corresponding to the address information, and then determines, in the first group according to the tag field, the first entry corresponding to the address information. The first entry (that is, the foregoing tag entry) includes a first field (that is, the foregoing state field) and a second field (that is, the foregoing pointer field), and the first field is used to record an occupation status of the data, such as an exclusive state or a shared state.

Step 402. If a first field in the first entry is an exclusive state, indicate, using a second field in the first entry, a node that occupies the data exclusively.

Step 403. Determine a second entry in the second table according to the address information of the data and a second field if a first field in the first entry is a shared state.

Step 404. Indicate, using a third field in the second entry, a node that shares the data.

After determining the first entry, the node controller determines, according to the first field in the first entry, whether the data corresponding to the address information is occupied exclusively or shared by another node.

It should be noted that information carried in the second field varies according to different information carried in the first field. For example, when the first field is an exclusive state, the second field is an owner pointer, and the owner pointer is used to indicate the node that occupies the data exclusively. When the first field is a shared state, the second field is a ptr pointer, and the ptr pointer and an index field in a memory address may be used together to indicate a second entry in the second table. The second entry includes the third field (that is, the foregoing share vector field), and the third field is used to indicate the node that shares the data.

Optionally, to compress the second table vertically, the node controller determines the first group in the first table and determines a second group in the second table according to slightly different index fields.

Further, the index field includes M-bit information, such as an M-bit binary address, where M is a positive integer greater than 1. In this embodiment of the present disclosure, when determining the first group in the first table, the node controller uses the M-bit information in the index field, that is, all-bit information in the index field. When determining the second group in the second table, the node controller uses N-bit information in the index field, where N is a positive integer greater than 0 but less than M, that is, some-bit information in the index field. That is, a quantity of binary address bits in an index field used when the node controller determines the second group in the second table is less than a quantity of binary address bits in an index field used when the node controller determines the first group in the first table.

For example, the index field includes a 3-bit binary address. When determining the first group in the first table, the node controller uses the 3-bit binary address, such as 000 or 100, in the index field, and the 3-bit binary address corresponds to a zeroth group or a fourth group in the first table. When determining the second group in the second table, the node controller uses a least significant 2-bit binary address in the index field, for example, a least significant 2-bit binary address corresponding to 000 or 100, that is, 00, and the 2-bit binary address corresponds to a zeroth group in the second table. The 3-bit binary address in the index field corresponds to eight groups in the first table, the 2-bit binary address in the index field corresponds to four groups in the second table, and a quantity of rows in the second table is reduced to half a quantity of rows in the first table.

Certainly, when determining the second group in the second table, the node controller may use some most significant bits of information in the index field instead of some least significant bits of information in the index field, and may use some non-consecutive bits of information in the index field instead of some consecutive bits of information in the index field. This is not limited herein. In addition, how many bits of information in the index field are used by the node controller to determine the second group in the second table is not limited herein.

Optionally, before determining, in the first table according to address information of data, a first entry corresponding to the address information, the method may further include creating the first entry in the first table according to the data when a first node in the at least two nodes caches the data, setting the first field to an exclusive state, and setting the second field so that the second field indicates the first node.

The data in a current node is occupied exclusively by the first node when the data is cached by the first node in the at least two nodes for the first time. In this case, the node controller creates, in the first table of the directory, the first entry that records the data, sets the first field in the first entry to an exclusive state, and further sets the second field in the first entry to an owner pointer that indicates the first node. Because the data is occupied exclusively by the first node, the second entry does not need to be created in the second table of the directory.

Optionally, after creating the first entry in the first table according to the data, the method further includes determining the first entry in the first table according to the address information when a second node in the at least two nodes caches the data, and if the first field is an exclusive state, setting the first field to a shared state, determining the second group in the second table according to the address information, creating the second entry in the second group, setting indication information of the first node and the second node in the third field, and setting the second field according to location information of the second entry in the second table, or if the first field is a shared state, determining the second entry in the second table according to the address information and the second field, and adding indication information of the second node to the third field.

When the second node also caches the data after the data is occupied exclusively by the first node, the data is changed from an exclusive state to a shared state, and in this case, the node controller modifies the first entry corresponding to the data, for example, modifies the first field in the first entry to a shared state, and modifies the second field in the first entry to a ptr pointer. In addition, the node controller further determines the second group in the second table according to the address information of the data, creates the second entry in the second group, and sets the indication information of the first node and the second node in the third field in the second entry.

If the data occupied exclusively by the first node has been changed to a shared state before the second node caches the data, the node controller modifies the third field in the second entry corresponding to the data, that is, adds the indication information of the second node. Certainly, the node controller may not modify content of the second entry, but creates a fourth entry in the second table, and sets the indication information of the second node in a fourth field in the fourth entry. This is not limited herein.

Optionally, after the creating the first entry in the first table according to the data, the method further includes determining the first entry in the first table according to the address information when a second node in the at least two nodes caches the data, and if the first field is an exclusive state, setting the first field to a shared state, determining the second group in the second table according to the address information, searching the second group for a third entry that includes indication information of the first node and the second node, determining the third entry as the second entry, and setting the second field according to location information of the second entry in the second table.

When the data occupied exclusively by the first node is shared by the second node, the second entry may not be created in the second table, but instead, the second group is determined in the second table according to the address information of the data, and it is learned, by means of searching, whether there is a third entry that is in the second group and that includes the indication information of the first node and the second node. If there is a third entry that includes the indication information of the first node and the second node to avoid redundancy in the second table, the node controller may not create, in the second table, the second entry that is the same as the third entry, but uses the third entry as the second entry, and sets the second field in the first entry according to location information of the third entry in the second table. In this way, the second table can be compressed to some extent such that an overall directory capacity is reduced.

Optionally, before determining, in the first table according to address information of data, a first entry corresponding to the address information, the method further includes creating the first entry in the first table according to the data when a first node in the at least two nodes caches the data, setting the first field to a shared state, determining the second group in the second table according to the address information, searching the second group for a third entry that includes indication information of the first node, determining the third entry as the second entry, and setting the second field according to location information of the second entry in the second table.

When the data is cached for the first time, the data may be cached in a shared state, and the node controller needs to create, in the first table, the first entry for the data. However, the node controller may not be in a hurry to create the second entry in the second group determined in the second table, but first learns, by means of searching, whether there is a third entry that is in the second group determined in the second table and that includes the indication information of the first node. If there is a third entry that includes the indication information of the first node, the third entry may be shared according to the foregoing method in order to avoid redundancy in the second table. Certainly, if a third entry that includes the indication information of the first node is not found in the second table, the second entry needs to be created in the second table.

Optionally, before determining, in the first table according to address information of data, a first entry corresponding to the address information, the method further includes the first entry in the first table according to the data when a first node in the at least two nodes caches the data, setting the first field to a shared state, determining the second group in the second table according to the address information, creating the second entry in the second group, setting indication information of the first node in the third field, and setting the second field according to location information of the second entry in the second table.

The data in a current node may be shared by the first node when the data is cached by the first node in the at least two nodes for the first time. In this case, the node controller creates, in the first table of the directory, the first entry that records the data, sets the first field in the first entry to a shared state, further determines the second group in the second table of the directory, creates the second entry in the second group, sets the indication information of the first node in the third field in the second entry, and sets the second field in the first entry according to the location information of the second entry in the second table. The second field uses a ptr pointer.

Optionally, after creating the first entry in the first table according to the data, the method further includes determining the first entry in the first table according to the address information when a second node in the at least two nodes caches the data, determining the second entry in the second table according to the address information of the data and the second field, and adding indication information of the second node to the third field.

When the data shared by the first node is further shared by the second node, the node controller may modify the third field in the second entry corresponding to the data, that is, add the indication information of the second node. Certainly, the node controller may not modify content of the second entry, but creates a fourth entry in the second table, and sets the indication information of the second node in a fourth field in the fourth entry. This is not limited herein.

The cache coherence management method in the embodiments of the present disclosure is described above, and a node controller in the embodiments of the present disclosure is described below.

Figure 5:
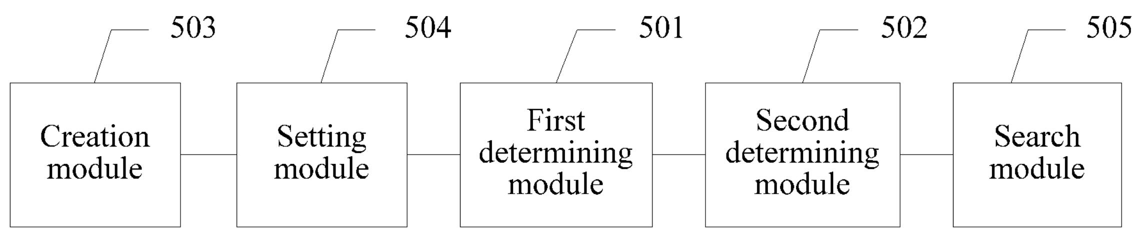
FIG. 5 is a block diagram of modules of an embodiment of a node controller according to the embodiments of the present disclosure.

Referring to FIG. 5, FIG. 5 is a block diagram of modules of an embodiment of a node controller according to the embodiments of the present disclosure. The node controller is applied to a multiprocessor system, the multiprocessor system includes a first table, a second table, and at least two nodes, and each node includes at least one processor. The node controller includes a first determining module 501 configured to determine, in the first table according to address information of data, a first entry corresponding to the address information, where the first entry includes a first field and a second field, the first field is used to record an occupation status of the data, and when the first field is an exclusive state, the second field is used to indicate a node that occupies the data exclusively, and a second determining module 502 configured to determine a second entry in the second table according to the address information of the data and the second field when the first field is a shared state, where the second entry includes a third field, and the third field is used to indicate a node that shares the data.

Optionally, the address information includes a tag field and an index field.

That a first determining module 501 is configured to determine, in the first table according to address information of data, a first entry corresponding to the address information may further include the first determining module 501 is configured to determine, in the first table according to the index field, a first group corresponding to the address information, and determine, in the first group according to the tag field, the first entry corresponding to the address information.

That a second determining module 502 is configured to determine a second entry in the second table according to the address information of the data and the second field when the first field is a shared state may further include the second determining module 502 is configured to determine a second group in the second table according to the index field, and determine the second entry in the second group according to the second field.

Optionally, the index field includes M-bit information, and M is a positive integer greater than 1.

That the second determining module 502 is configured to determine a second group in the second table according to the index field, and determine the second entry in the second group according to the second field may further include the second determining module 502 is configured to determine the second group in the second table according to N-bit information in the index field, where N is a positive integer greater than 0 but less than M.

Optionally, the node controller may further include a creation module 503 and a setting module 504.

Before the first determining module 501 determines, in the first table according to the address information of the data, the first entry corresponding to the address information, the creation module 503 is configured to create the first entry in the first table according to the data when a first node in the at least two nodes caches the data, and the setting module 504 is configured to set the first field to an exclusive state, and set the second field so that the second field indicates the first node.

Optionally, after the creation module 503 creates the first entry in the first table according to the data, the first determining module 501 is further configured to determine the first entry in the first table according to the address information when a second node in the at least two nodes caches the data.

If the first field is an exclusive state, the setting module 504 is further configured to set the first field to a shared state, the second determining module 502 is further configured to determine the second group in the second table according to the address information, the creation module 503 is further configured to create the second entry in the second group, and the setting module 504 is further configured to set indication information of the first node and the second node in the third field, and set the second field according to location information of the second entry in the second table.

If the first field is a shared state, the second determining module 502 is further configured to determine the second entry in the second table according to the address information and the second field, and the setting module 504 is further configured to add indication information of the second node to the third field.

Optionally, the node controller may further include a search module 505.

After the creation module 503 creates the first entry in the first table according to the data, the first determining module 501 is further configured to determine the first entry in the first table according to the address information when a second node in the at least two nodes caches the data.

If the first field is an exclusive state, the setting module 504 is further configured to set the first field to a shared state, the second determining module 502 is further configured to determine the second group in the second table according to the address information, the search module 505 is configured to search the second group for a third entry that includes indication information of the first node and the second node, the second determining module 502 is further configured to determine the third entry as the second entry, and the setting module 504 is further configured to set the second field according to location information of the second entry in the second table.

Optionally, before the first determining module 501 determines, in the first table according to the address information of the data, the first entry corresponding to the address information, the creation module 503 is configured to create the first entry in the first table according to the data when a first node in the at least two nodes caches the data, the setting module 504 is configured to set the first field to a shared state, the second determining module 502 is further configured to determine the second group in the second table according to the address information, the search module 505 is configured to search the second group for a third entry that includes indication information of the first node, the second determining module 502 is further configured to determine the third entry as the second entry, and the setting module 504 is further configured to set the second field according to location information of the second entry in the second table.

Optionally, before the first determining module 501 determines, in the first table according to the address information of the data, the first entry corresponding to the address information, the creation module 503 is configured to create the first entry in the first table according to the data when a first node in the at least two nodes caches the data, the setting module 504 is configured to set the first field to a shared state, the second determining module 502 is further configured to determine the second group in the second table according to the address information, the creation module 503 is further configured to create the second entry in the second group, and the setting module 504 is further configured to set indication information of the first node in the third field, and set the second field according to location information of the second entry in the second table.

Optionally, after the creation module 503 creates the first entry in the first table according to the data, the first determining module 501 is further configured to determine the first entry in the first table according to the address information when a second node in the at least two nodes caches the data, the second determining module 502 is further configured to determine the second entry in the second table according to the address information of the data and the second field, and the setting module 504 is further configured to add indication information of the second node to the third field.

Figure 6:
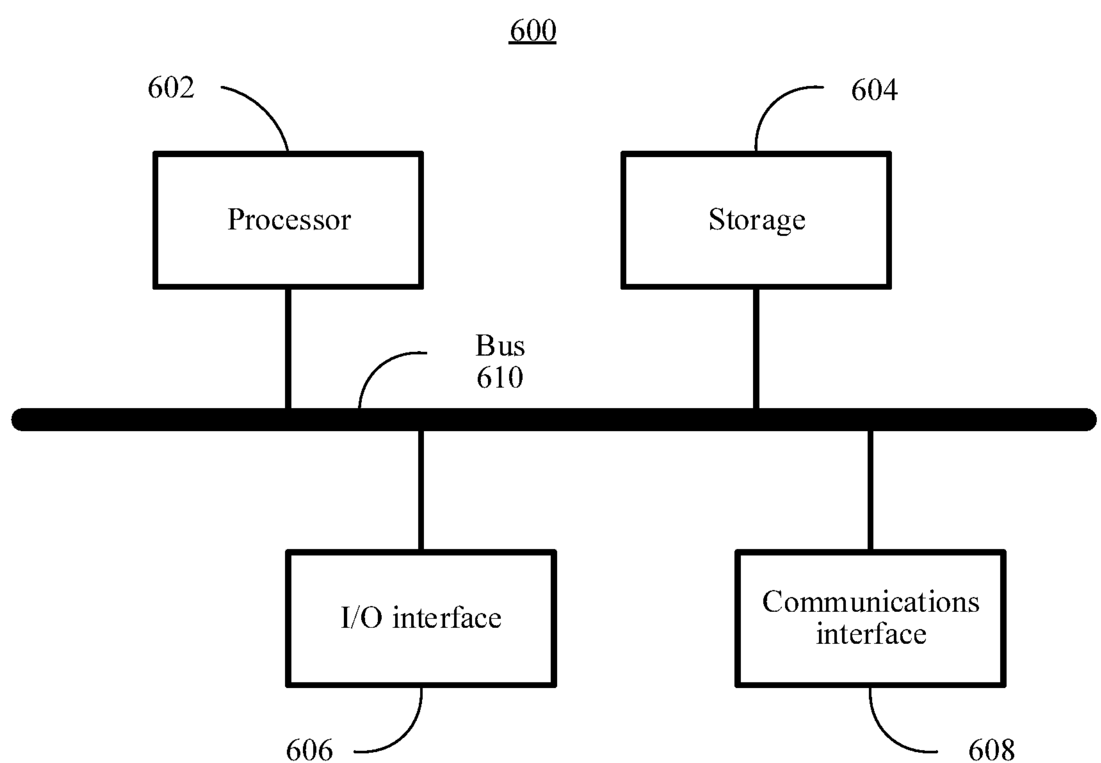
FIG. 6 is a schematic structural diagram of hardware of an embodiment of a node controller according to the embodiments of the present disclosure.

FIG. 6 is a schematic structural diagram of hardware of a node controller 600 according to an embodiment of the present disclosure. As shown in FIG. 6, the node controller 600 includes a processor 602, a storage 604, an I/O interface 606, a communications interface 608, and a bus 610. The processor 602, the storage 604, the I/O interface 606, and the communications interface 608 are communicatively connected to each other using the bus 610.

The processor 602 may be a general-purpose CPU, a microprocessor, an application-specific integrated circuit (ASIC), or one or more integrated circuits, and is configured to execute a related program in order to implement the technical solutions provided in the embodiments of the present disclosure.

The storage 604 may be a read-only memory (ROM), a static storage device, a dynamic storage device, or a random access memory (RAM). The storage 604 may store an operating system and another application program. When the technical solutions provided in the embodiments of the present disclosure are implemented using software or firmware, program code used to implement the technical solutions provided in the embodiments of the present disclosure is stored in the storage 604 and is executed by the processor 602.

The I/O interface 606 is configured to receive input data and information, and output data such as an operation result.

The communications interface 608 is a transceiver apparatus such as a transceiver to implement communication between the node controller 600 and another device or a communications network.

The bus 610 may include a channel to transfer information between parts (such as the processor 602, the storage 604, the I/O interface 606, and the communications interface 608) of the node controller 600.

It should be noted that, although for the node controller 600 shown in FIG. 6, merely the processor 602, the storage 604, the I/O interface 606, the communications interface 608, and the bus 610 are shown, in a specific implementation process, persons skilled in the art should understand that the node controller 600 further includes another component required for normal running. In addition, persons skilled in the art should understand that, according to a specific requirement, the node controller 600 may further include a hardware component that implements another additional function. In addition, persons skilled in the art should understand that the node controller 600 may include only components essential for implementing the embodiments of the present disclosure, but does not necessarily include all the components shown in FIG. 6.

The hardware structure shown in FIG. 6 and the foregoing descriptions are applicable to various node controllers and cache coherence management systems provided in the embodiments of the present disclosure, and are applicable to performing various cache coherence management methods provided in the embodiments of the present disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A cache coherence management method performed by a node controller, wherein the method is applied to a multiprocessor system, and wherein the method comprises:

determining, in a first table according to address information of data, a first entry corresponding to the address information, wherein the first entry comprises a first field and a second field, wherein the first field records an occupation status of the data, and wherein the multiprocessor system comprises the first table, a second table, the node controller, and at least two nodes;

determining a node occupying the data according to the second field when the first field comprises an exclusive state, wherein the second field indicates the node occupying the data exclusively when the first field comprises the exclusive state; and determining a second entry in the second table according to the address information of the data and the second field when the first field comprises a shared state, wherein the second field indicates location information of the second entry in the second table when the first field comprises the shared state, wherein the second entry comprises a third field, and wherein the third field indicates a node that shares the data.

2. The cache coherence management method of claim 1, wherein the address information comprises a tag field and an index field, and wherein determining the first entry corresponding to the address information comprises:

determining, in the first table according to the index field, a first group corresponding to the address information; and determining, in the first group according to the tag field, the first entry corresponding to the address information, and wherein determining the second entry in the second table comprises:

determining a second group in the second table according to the index field; and determining the second entry in the second group according to the second field.

3. The cache coherence management method of claim 2, wherein the index field comprises M-bit information, wherein the M is a positive integer greater than one, wherein determining the second group in the second table comprises determining the second group in the second table according to N-bit information in the index field, and wherein the N is a positive integer greater than zero and less than the M.

4. The cache coherence management method of claim 1, wherein before determining the first entry corresponding to the address information, the method further comprises:

creating the first entry in the first table according to the data when the data is cached exclusively by a first node in the at least two nodes;

setting the first field to the exclusive state; and setting the second field to indicate the first node.

5. The cache coherence management method of claim 4, wherein after creating the first entry in the first table, the cache coherence management method further comprises:

determining the first entry in the first table according to the address information when the data is cached by the first node and a second node in the at least two nodes;

when the first field comprises the exclusive state, setting the first field to the shared state, determining a second group in the second table according to the address information, creating the second entry in the second group, setting indication information of the first node and the second node in the third field, and setting the second field according to location information of the second entry in the second table; and when the first field comprises the shared state, adding the indication information of the second node to the third field.

6. The cache coherence management method of claim 4, wherein after creating the first entry in the first table, the cache coherence management method further comprises:

determining the first entry in the first table according to the address information when the data is cached by the first node and a second node in the at least two nodes; and when the first field comprises the exclusive state, setting the first field to the shared state, determining a second group in the second table according to the address information, searching the second group for a third entry comprising indication information of the first node and the second node, determining the third entry as the second entry, and setting the second field according to location information of the second entry in the second table.

7. The cache coherence management method of claim 1, wherein before determining the first entry corresponding to the address information, the cache coherence management method further comprises:

creating the first entry in the first table according to the data when the data is cached exclusively by a first node in the at least two nodes;

setting the first field to the shared state;

determining a second group in the second table according to the address information;

searching the second group for a third entry comprising indication information of the first node;

determining the third entry as the second entry; and setting the second field according to the location information of the second entry in the second table.

8. A node controller, applied to a multiprocessor system, comprising:

a memory configured to store program instructions; and a processor coupled to the memory, wherein the program instructions cause the processor to be configured to:

determine, in a first table according to address information of data, a first entry corresponding to the address information, wherein the first entry comprises a first field and a second field, wherein the first field records an occupation status of the data, and wherein the multiprocessor system comprises the first table, a second table, and at least two nodes;

determine a node occupying the data according to the second field when the first field comprises an exclusive state, wherein the second field indicates the node occupying the data exclusively when the first field comprises the exclusive state; and determine a second entry in the second table according to the address information of the data and the second field when the first field comprises a shared state, wherein the second field indicates location information of the second entry in the second table when the first field comprises the shared state, wherein the second entry comprises a third field, and wherein the third field indicates a node that shares the data.

9. The node controller of claim 8, wherein the address information comprises a tag field and an index field, and wherein the program instructions further cause the processor to be configured to:

determine, in the first table according to the index field, a first group corresponding to the address information;

determine, in the first group according to the tag field, the first entry corresponding to the address information;

determine a second group in the second table according to the index field; and determine the second entry in the second group according to the second field.

10. The node controller of claim 9, wherein the index field comprises M-bit information, wherein the M is a positive integer greater than one, wherein the program instructions further cause the processor to be configured to determine the second group in the second table according to N-bit information in the index field, and wherein the N is a positive integer greater than zero and less than the M.

11. The node controller of claim 8, wherein the program instructions further cause the processor to be configured to:

create the first entry in the first table according to the data when the data is cached exclusively by a first node in the at least two nodes;

set the first field to the exclusive state; and set the second field to indicate the first node.

12. The node controller of claim 11, wherein the program instructions further cause the processor to be configured to:

determine the first entry in the first table according to the address information when the data is cached exclusively by a second node in the at least two nodes;

when the first field comprises the exclusive state, set the first field to the shared state, determine a second group in the second table according to the address information, create the second entry in the second group, set indication information of the first node and the second node in the third field, and set the second field according to location information of the second entry in the second table; and when the first field comprises the shared state, add the indication information of the second node to the third field.

13. The node controller of claim 11, wherein the program instructions further cause the processor to be configured to:

determine the first entry in the first table according to the address information when the data is cached by the first node and a second node in the at least two nodes; and when the first field comprises the exclusive state, set the first field to the shared state, determine a second group in the second table according to the address information, search the second group for a third entry comprising indication information of the first node and the second node, set the third entry as the second entry, and set the second field according to location information of the second entry in the second table.

14. The node controller of claim 8, wherein the program instructions further cause the processor to be configured to:

create the first entry in the first table according to the data when the data cached exclusively by a first node in the at least two nodes;

set the first field to the shared state;

determine a second group in the second table according to the address information;

search the second group for a third entry comprising indication information of the first node;

determine the third entry as the second entry; and set the second field according to the location information of the second entry in the second table.

15. A multiprocessor system, comprising:

a node controller;

a first table;

a second table; and at least two nodes, wherein each node of the at least two nodes comprises at least one processor, and wherein the first table, the second table, and the at least two nodes are coupled to the node controller, and wherein the node controller is configured to:

determine, in the first table according to address information of data, a first entry corresponding to the address information, wherein the first entry comprises a first field and a second field, and wherein the first field records an occupation status of the data;

determine a node occupying the data according to the second field when the first field comprises an exclusive state, wherein the second field indicates the node occupying the data exclusively when the first field comprises the exclusive state; and determine a second entry in the second table according to the address information of the data and the second field when the first field comprises a shared state, wherein the second field indicates location information of the second entry in the second table when the first field comprises the shared state, wherein the second entry comprises a third field, and wherein the third field indicates a node that shares the data.

16. The system of claim 15, wherein the address information comprises a tag field and an index field, and wherein the node controller is further configured to:

determine, in the first table according to the index field, a first group corresponding to the address information;

determine, in the first group according to the tag field, the first entry corresponding to the address information;

determine a second group in the second table according to the index field; and determine the second entry in the second group according to the second field.

17. The system of claim 16, wherein the index field comprises M-bit information, wherein the M is a positive integer greater than one, wherein the node controller is further configured to determine the second group in the second table according to N-bit information in the index field, and wherein the N is a positive integer greater than zero and less than the M.

18. The system of claim 15, wherein the node controller is further configured to:

create the first entry in the first table according to the data when the data is cached exclusively by a first node in the at least two nodes;

set the first field to the exclusive state; and set the second field to indicate the first node.

19. The system of claim 18, wherein the node controller is further configured to:

determine the first entry in the first table according to the address information when the data is cached by the first node and a second node in the at least two nodes;

when the first field comprises the exclusive state, set the first field to the shared state, determine a second group in the second table according to the address information, create the second entry in the second group, set indication information of the first node and the second node in the third field, and set the second field according to location information of the second entry in the second table; and when the first field comprises the shared state, add the indication information of the second node to the third field.

20. The system of claim 18, wherein the node controller is further configured to:

determine the first entry in the first table according to the address information when the data is cached by the first node and a second node in the at least two nodes; and when the first field comprises the exclusive state, set the first field to the shared state, determine a second group in the second table according to the address information, search the second group for a third entry comprising indication information of the first node and the second node, determine the third entry as the second entry, and set the second field according to location information of the second entry in the second table.

* * * * *